UNITED STATES PATENT OFFICE.

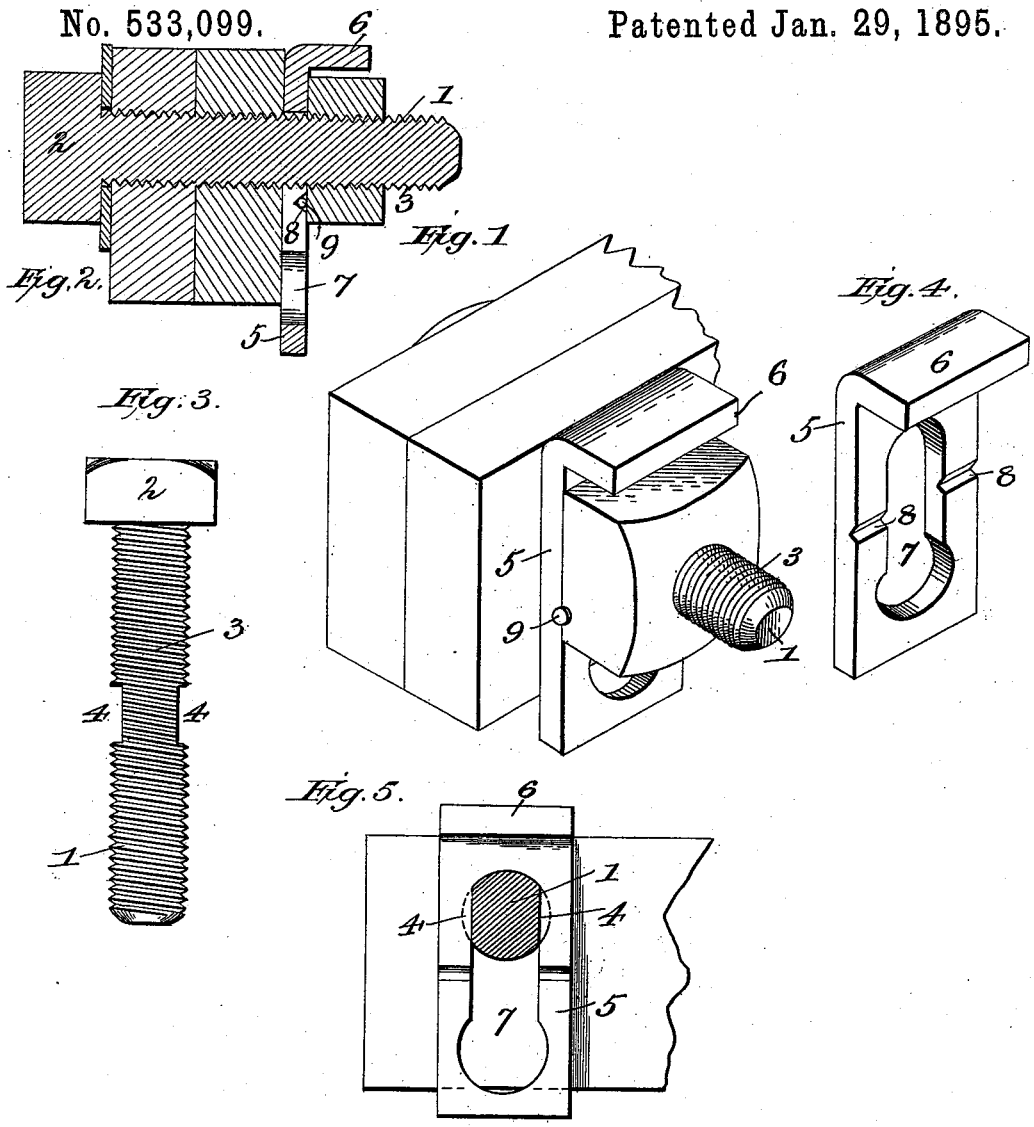

JAMES C. SWAN, OF LONE CEDAR, WEST VIRGINIA.

NUT-LOCK.

SPECIFICATION forming part of Letters Patent No. 533,099, dated January 29, 1895.

Application filed April 16, 1894. Serial No. 507,716. (No model.)

*To all whom it may concern:*

Be it known that I, JAMES C. SWAN, a citizen of the United States, and a resident of Lone Cedar, in the county of Jackson and State of West Virginia, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

My invention relates to improvements in nut locks and its object is to provide a novel construction which shall be simple and economical to manufacture, while in use the nut will be securely locked so as to prevent turning of the same.

The invention consists in the novel construction and combination of parts hereinafter fully described and claimed.

In the accompanying drawings: Figure 1 is a perspective view showing a screw bolt with my improvements applied thereto. Fig. 2 is a central longitudinal section of the same. Fig. 3 is an elevation of the bolt. Fig. 4 is a perspective view of the locking plate. Fig. 5 is an end view of the bolt and locking plate, the nut being removed.

In the said drawings the reference numeral 1 designates a bolt having a head 2, and formed with screw threads 3, in the ordinary or usual manner. This bolt, intermediate its ends, is cut away on opposite sides, forming recesses 4.

The numeral 5 designates the locking plate consisting of a rectangular metal plate having one end bent at a right angle forming a flange 6, which overlaps one of the sides of the nut when the latter is screwed home as hereinafter described. The plate is formed with an elongated slot 7, of a size equaling the reduced portion of the bolt caused by cutting away and forming the recesses 4. The end of the slot opposite to the flange 6 is made circular in form and of a diameter corresponding with that of the bolt, so that the latter can readily pass therethrough. The outer face of the plate 5 is formed with two aligned notches 8, to receive a pin 9.

The operation is as follows: The bolt is passed through the objects to be secured together in the usual manner. The locking plate is then passed over the screw threaded end of the bolt, which will readily pass through the enlarged end of the slot, and pressed up against the side of the object through which the bolt passes. The nut is then applied and screwed home, when the plate is pushed downward so that the flange 6 will overlap the upper side of the nut, the sides of the contracted portion of the slot engaging with the recesses 4; so that the plate will be prevented from turning, and the said flange, by engaging with the nut, will securely lock the latter. The pin 9 is then inserted in the notches 8, engaging with the under side of the nut, so as to lock said plate and prevent it from being returned to normal position until the pin is removed.

In Fig. 2 the groove to receive the locking pin is shown as being formed in the plate 7, while in Fig. 1 a similar groove is also formed in the nut.

Having thus described my invention, what I claim is—

In a nut lock, the combination with the screw bolt formed with diametrically opposite recesses, and a nut therefor, of the locking plate having a flange at one end and formed with an elongated slot enlarged at one end to receive the full section of the bolt, and also formed on its outer face with aligned notches, and the locking pin engaging with said notches and the nut, substantially as described.

In testimony that I claim the foregoing as my own I have hereunto affixed my signature in presence of two witnesses.

JAMES C. SWAN.

Witnesses:
A. J. PICKERING,
TROY PICKENS.